UNITED STATES PATENT OFFICE.

THOMAS JAMES HESKETT, OF BRUNSWICK, AND MONTAGUE MOORE, OF MELBOURNE, VICTORIA, AUSTRALIA.

DIRECT PROCESS OF MANUFACTURING IRON AND STEEL.

No. 917,475.  Specification of Letters Patent.  Patented April 6, 1909.

Application filed August 6, 1906. Serial No. 329,502.

*To all whom it may concern:*

Be it known that we, THOMAS JAMES HESKETT and MONTAGUE MOORE, subjects of the King of Great Britain, residing at No. 2 Donald street, Brunswick, in the State of Victoria and Commonwealth of Australia, and No. 314 Collins street, Melbourne, in the said State, respectively, have invented a certain new and useful Improvement in the Direct Process of Manufacturing Iron and Steel, of which the following is a specification.

As is well known in the direct process of manufacturing wrought iron the reduced ore produced is fed into a gas or other reverberatory furnace and heated and "balled up" while in contact with molten slag, and when manufacturing steel the reduced ore is melted beneath a covering of molten slag.

Up to the present it has been found impossible to produce iron and steel by a direct process without an excessive loss of iron. Now we have ascertained that this loss of iron can be avoided if the reduced ore does not come into contact with a slag in a ferric condition, that is, in an oxidizing state, which reoxidizes the reduced iron, notwithstanding that it may be covered by the slag therein and thereby protected from direct contact with the oxidizing gases in the furnace.

Our invention therefore consists in keeping the slag in the gas or other reverberatory furnace in the ferrous condition, that is, in a state in which it contains a minimum of oxygen, and is prevented from absorbing oxygen from the gases of the furnace, whereby any oxidation of the reduced iron by contact with the slag is prevented. We effect this result when manufacturing wrought iron by adding from time to time to the slag, solid carbon or any other suitable deoxidizing material which at the furnace temperature, has, like carbon, a greater affinity for oxygen than iron has for oxygen.

In lieu of adding solid carbon or other suitable deoxidizing material to the slag, blocks thereof may be inserted in the lining of the furnace so that they are in contact with the slag.

When steel is to be manufactured we take previously reduced iron and solid carbonaceous material, in equal proportions by volume, and mix them together and then add sufficient tar or other suitable material to bind the whole, which is then molded into bricks of sufficient density to sink beneath the slag in the furnace where it melts and forms a bath of highly carburized iron, thus greatly facilitating the melting of the reduced iron fed to the furnace. The proportions of highly carburized iron in the furnace and reduced iron fed thereto will regulate the grade of steel to be produced, consequently any degree of carburization in the steel can be obtained.

When making steel an excess of carbon is provided in the bricks sufficient when melted to saturate with carbon the iron it contains, and in addition to also provide sufficient carbon in excess, to maintain the slag covering of the metal in the ferrous or non-oxidizing condition. If under any circumstances this condition is not maintained, solid carbon may be added to the bath as required.

Having now fully described and ascertained our said invention, and the manner in which it is to be performed, we declare that what we claim is:—

1. The process of manufacturing iron and steel which consists in covering the reduced iron within a furnace with a slag which is so strongly mixed with a reducing substance that ferric combinations contained in such slag are reduced to ferrous combinations which cannot act on the reduced iron to oxidize it.

2. The process of manufacturing iron and steel which consists in covering the reduced iron within a furnace with a slag, the slag being so strongly mixed with a solid carbon that ferric combinations contained in such slag are reduced to ferrous combinations whereby the reduced ore will be protected from oxidation.

3. The herein described improvement in the art of producing steel which consists in forming the slag over the reduced metal within a furnace, the slag being kept in a ferrous condition by the mixture therewith of reduced iron and a reducing substance.

In testimony whereof we have hereunto set our hands in presence of two subscribing witnesses.

THOMAS JAMES HESKETT.
MONTAGUE MOORE.

Witnesses:
WALTER S. BOYSTON,
FRANK BOYSTON.